M. F. BOONE.
BELT TIGHTENER FOR POWER TRANSMISSION.
APPLICATION FILED JULY 2, 1917.

1,252,227.

Patented Jan. 1, 1918.

Witnesses
W. Moore
E. L. Mueller

Inventor
M. F. Boone
By
Attorneys

UNITED STATES PATENT OFFICE.

MILLARD F. BOONE, OF PENSACOLA, FLORIDA.

BELT-TIGHTENER FOR POWER TRANSMISSION.

1,252,227.

Specification of Letters Patent.

Patented Jan. 1, 1918.

Application filed July 2, 1917. Serial No. 178,171.

*To all whom it may concern:*

Be it known that I, MILLARD F. BOONE, a citizen of the United States, residing at Pensacola, in the county of Escambia, State of Florida, have invented certain new and useful Improvements in Belt-Tighteners for Power Transmission; and I do hereby declare the following to be a full, clear, and exact description of the invention, such as will enable others skilled in the art to which it appertains to make and use the same.

This invention is an improvement in power transmission and has for one of its objects a novel arrangement of belt drives for shaftings particularly adapted for use in driving shafts at any angle to each other.

Another object is the provision of an adjustable belt tightener which is yieldably supported in a novel manner and which carries one of the pulleys over which the belt passes so that said pulley may be adjusted to vary the tension of said plate.

The inventive idea involved is capable of receiving a variety of mechanical expressions, one of which for the purpose of illustrating the invention, is shown in the accompanying drawing, wherein:—

Figure 1:
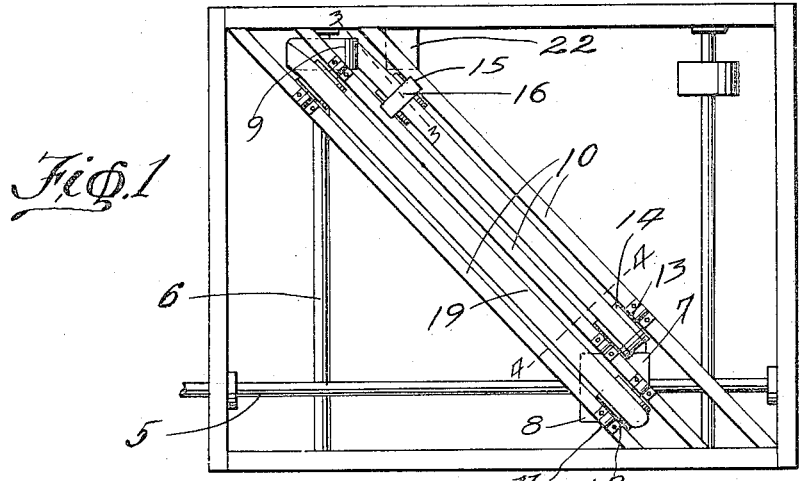
Figure 1 is a top plan view of the apparatus constructed in accordance with the invention.
Figure 2:
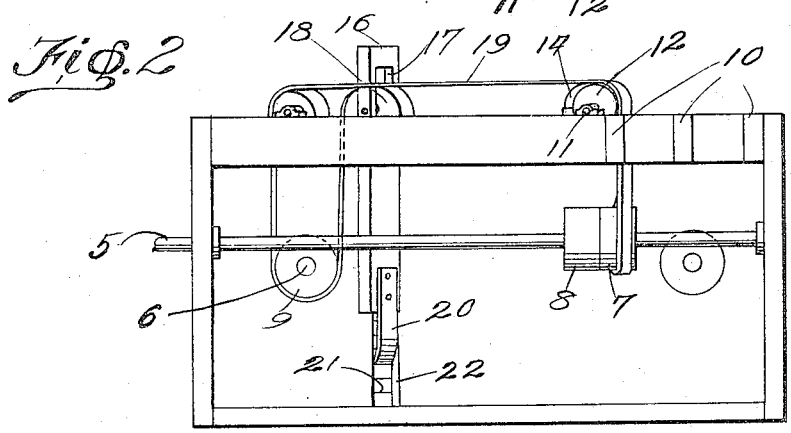
Fig. 2 is a view in elevation.
Figures 3, 4:
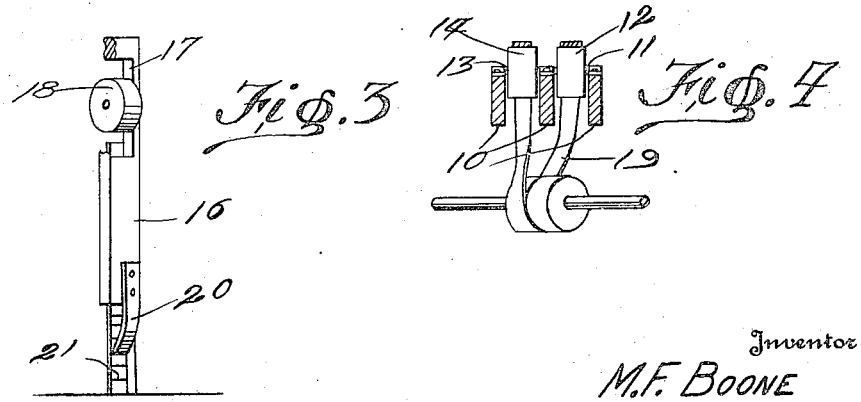
Fig. 3 is a fragmentary elevational view of the belt tightener.
Fig. 4 is a section on the line 4—4 of Fig. 1.

Referring more particularly to the accompanying drawing in which like reference characters indicate similar parts the numerals 5 and 6 indicate drive and driven shafts respectively arranged at right angles to each other, the former shaft having fixed thereon a drive pulley 7 and loosely mounted thereon an idler pulley 8. Fixed on the driven shaft 6 is a driven pulley 9 which is operated in a manner to be described.

Mounted above the shafts 5 and 6 and extending diagonally relative to both shafts are a plurality of horizontal supporting beams 10 arranged in parallel relation to each other. Journaled in two of the adjacent beams at each end thereof are stub shafts 11 which have mounted thereon pulleys 12, each pulley extending between said beams. A stub shaft 13 is also journaled in the other of said beams 10 and the adjacent one of the first named beams and said shaft also supports a pulley 14 which is arranged in staggered relation with reference to the pulley 12 journaled in the adjacent ends of said first named beams. The beams 10 supporting the last named pulley 14 are provided adjacent the opposite ends thereof with oppositely disposed grooves 15 upon their inner adjacent faces in which is vertically adjustable a belt tightener, generally indicated by the numeral 16 and which will presently be described in detail. This tightener is slotted as indicated at 17 and has journaled in said slot a pulley 18. An endless drive belt 19 is engaged under either of the pulleys 7 or 8 and then extends upwardly and over one of the pulleys 12 and thence to the other pulley 12 and downwardly to the driven pulley 9 carried by the driven shaft 6. The belt passes underneath this last named pulley and upwardly to the pulley 18 carried by the belt tightener 16 and thence over the pulley 14 and downwardly to either of the pulleys 7 or 8, it being understood that when said belt is in engagement with the pulley 8 the same will remain idle owing to the loose mounting of said pulley. It will be apparent from the arrangement of all of the pulleys that the belt need only be twisted slightly in order to mount the same over and under said pulleys which fact renders said belt less liable to be disengaged and thrown out of operation.

The belt tightener 16 has secured to its lower end a spring member 20 the free end of which is adapted to engage any one of a number of notches 21 formed upon a post or standard 22 arranged adjacent the tightener and when in this position said spring member is placed under tension owing to the tension of the drive belt 19 so that said tightener 16 is yieldably mounted in the grooves 15. Should it be desired to further tighten the belt said tightener 16 may be moved vertically in an upward direction until the free end of the spring member 20 engages another of the notches 21 and this upward movement of the tightener will take up the desired slack in said belt.

What is claimed is:—

1. In an apparatus of the class described, the combination of a drive and a driven shaft, supporting members mounted above said shafts in a diagonal position relative thereto, pulleys journaled in said supporting members, a belt tightener movable vertically between two of said supporting members, a pulley carried by said tightener, and a drive belt passing around the pulleys on said shafts, the pulleys journaled in said supporting members and the pulley carried by said belt tightener.

2. In a belt tightener, the combination with a notched standard, of a vertically adjustable body portion, a pulley carried thereby, and a spring member having one end secured to said body portion and its free end adapted for engagement in any one of said notches whereby to vary the tension of a belt which passes over said pulley.

In testimony whereof, I affix my signature, in the presence of two witnesses.

MILLARD F. BOONE.

Witnesses:
E. Y. MALONE,
KATHLEEN MALLORY.

Copies of this patent may be obtained for five cents each, by addressing the "Commissioner of Patents, Washington, D. C."